Dec. 31, 1940.   H. WOLLNER   2,227,116
UNIVERSAL JOINT AND PROPELLER SHAFT ASSEMBLY
Filed Aug. 22, 1938   3 Sheets-Sheet 3

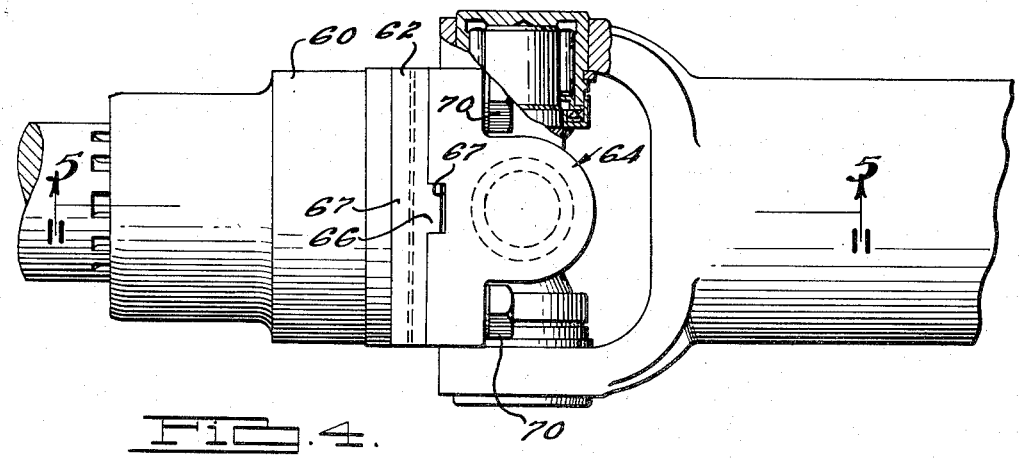
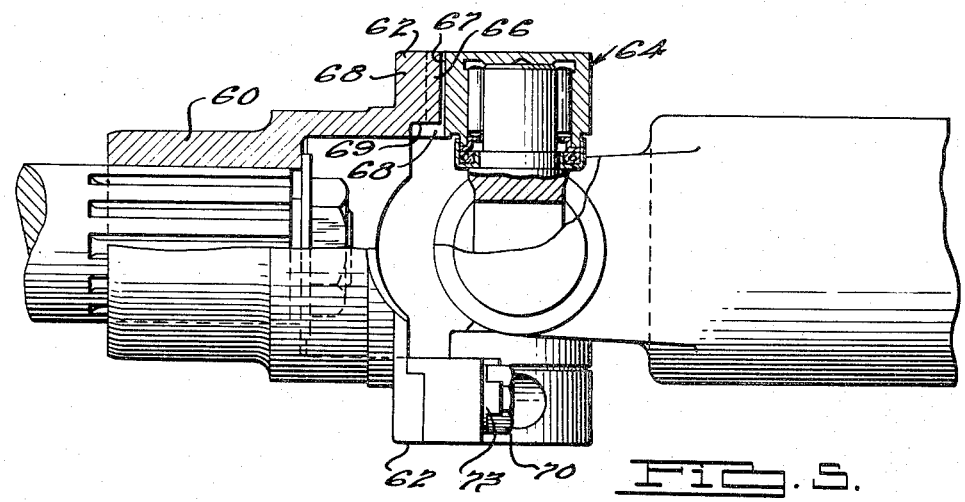
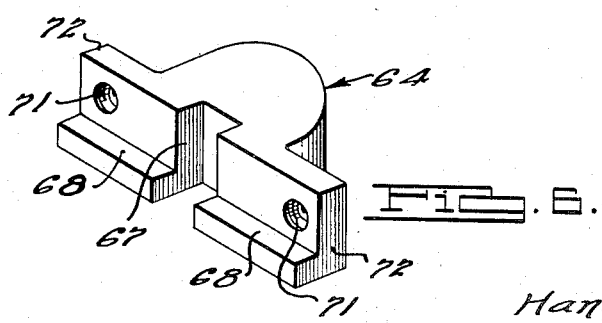

INVENTOR
Hans Wollner.
BY
Barness, Dickey & Pierce.
ATTORNEYS.

Patented Dec. 31, 1940

2,227,116

UNITED STATES PATENT OFFICE 2,227,116

UNIVERSAL JOINT AND PROPELLER SHAFT ASSEMBLY

Hans Wollner, Detroit, Mich., assignor to Universal Products Company, Incorporated, Dearborn, Mich., a corporation of Delaware Application August 22, 1938, Serial No. 226,029

1 Claim. (Cl. 64—17)

The present invention relates to universal joints of the so-called knock-down type, and to a novel method of assembling such a joint in an automobile propeller shaft.

In general, the invention relates to the type of knock-down universal joint disclosed in the patent to Swenson, No. 1,987,669, in which the trunnions of a cross type universal joint are journalled in bearing blocks detachably secured by means of bolts, cap screws, or the like to a torque transmitting collar or yoke.

It is one of the objects of the present invention to provide a knock-down joint of the type mentioned, having an improved means for locating the bearing blocks on the torque transmitting element and with respect to the trunnions journalled therein.

A more particular object is to provide a bearing block locating means in a joint of the type mentioned, which may be cheaply and accurately produced by an ordinary surface broaching operation.

Another object of the invention is to provide a novel assembly of a universal joint of the type mentioned in connection with the propeller shaft and an emergency brake drum carried thereby.

Other objects and advantages will become apparent from the following specification, the accompanying drawings, and the appended claims.

In the drawings:

Fig. 4 is a view similar to Fig. 1, showing a slightly modified form of universal joint;

Fig. 5 is a partial sectional view taken on the line 5—5 of Fig. 4;

Fig. 6 is a perspective view of the bearing block embodied in the universal joint shown in Figs. 4 and 5;

Figure 1:
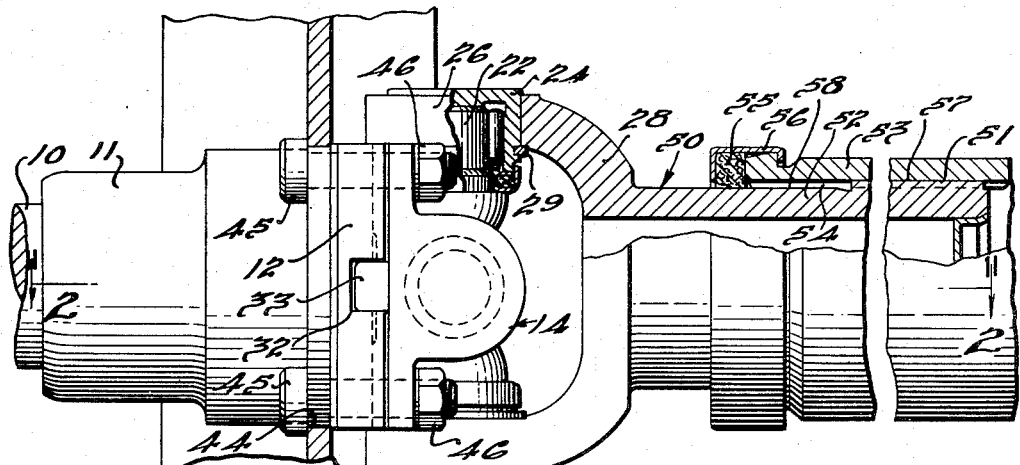
Figure 1 is an elevational view of a propeller shaft, universal joint, brake drum, and spline joint, partly in central longitudinal section.
Figure 2:
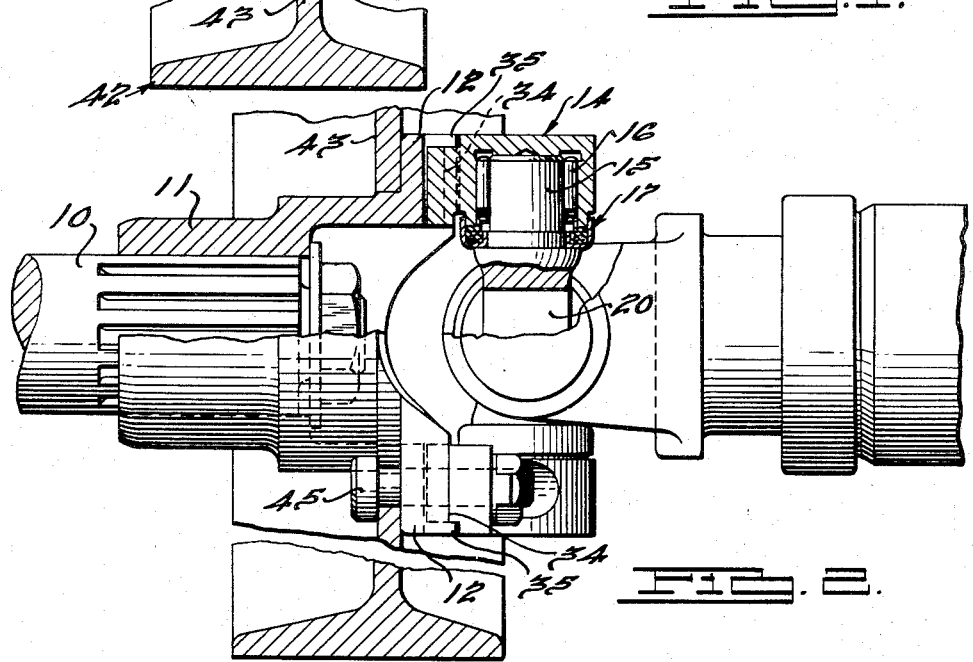
Fig. 2 is a partial sectional view, taken on the line 2—2 of Fig. 1.
Figure 3:
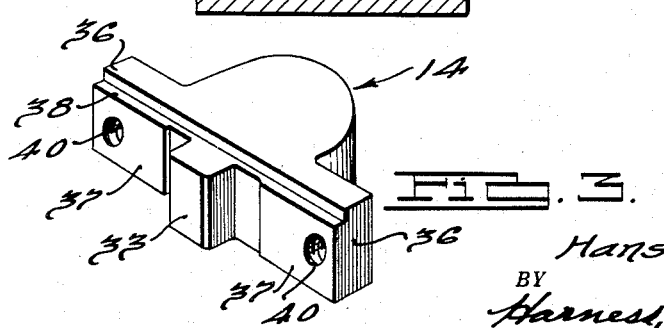
Fig. 3 is a perspective view of one of the bearing blocks.

Referring particularly to Figs. 1 and 2, there is shown a drive shaft 10, which in the usual automobile construction projects rearwardly from the transmission casing. Fixedly carried upon the shaft 10 by means of the conventional spline connection is a collar or yoke 11, generally cylindrical in form, but provided with a pair of oppositely directed, radially extending gears 12. A pair of bearing blocks, indicated generally at 14, and shown best in Fig. 3, are secured to the ears 12 by means hereinafter described, and rotatably support a pair of oppositely directed aligned trunnions 15. Preferably, slender needle bearings 16 are provided between the trunnions and the inner walls of the bearing blocks, and the inner or open ends of the bearing cups are sealed in the usual manner by means of a sealing or packing ring assembly 17. Trunnions 15 form two of the four trunnions on a cross member 20. The other two trunnions, 22, which are also aligned and which project at right angles to the trunnions 15, are similarly journalled in bearing cups 24 which are removably mounted within eye members 26 formed integrally in the arms of the yoke member 28. A removable resilient ring 29 operates to prevent outward movement of the cups 24 relative to the eyes 26. The means for journalling trunnions 22 on yoke 28 is conventional and forms no part of the present invention.

It will be observed that in a universal joint construction of the type described, that all of the driving torque transmitted from the collar 11 to the cross member 20 is transmitted through the connection between the bearing blocks 14 and the ears 12 on the collar. Moreover, since the trunnions 15 have an end thrust bearing engagement upon the inner end walls of the bearing blocks, the radial thrust forces required to center the joint are also transmitted through the connection between the bearing block 14 and ears 12. Accordingly, the connection between these members must not only be quite rugged in order to transmit the driving torque, but must provide for a very accurate positioning of the bearing blocks radially of the joint in order to produce a running fit between the ends of the trunnions and inner end walls of the bearing blocks without any substantial clearance.

The attaching means for this purpose comprises a radially extending keyway 32 in each of the ears 12 into which projects a key 33 formed integrally on each of the bearing blocks. The key and keyway having a close fit, serve to transmit the driving torque between the collar and the bearing blocks. In addition, the face of each of the ears 12 is provided with a recess 34 beneath an axially projecting flange 35 on each of the ears. The bearing blocks are formed with a pair of oppositely extending ears or lugs 36 having a pair of flat surfaces 37 adapted to seat against the bottom of the recesses 34, and they are also provided with a shoulder 38 adapted to bear against the underside of the flange 35. The underside of the flange 35 and the shoulder 38 are in the form of planular surfaces extending at right angles to the keyway and key 32 and 33, and serve to position the bearing blocks 14 radially with respect to the joint and to sustain the radial thrust loads required to properly center the joint. These surfaces also function to prevent inclination of the axis of the bearing blocks with respect to the axis of the trunnions.

It is quite essential in the construction of knock-down joints of the type herein involved that the radial position of the bearing blocks be accurately fixed, and accordingly, the inner surface of flange 35 must be very accurately located with respect to the center of the joint and the shoulder 38 on the bearing block must likewise be very accurate with respect to the inner end wall of the block. In prior joints of this type, the inter-engaging surfaces which sustained the radial thrust on the bearing blocks were formed on an arc concentric with the center of the joint, with the result that relatively expensive and unsatisfactory expedients were required to finish and locate the thrust surfaces. In accordance with the present invention these difficulties are overcome by forming the thrust surfaces on the inner sides of the flanges 35 as planular surfaces which are perpendicular to the radial slots 32, and which, therefore, are parallel to each other. As a result, it is possible to finish the inner sides of both flanges 35 simultaneously by a single pass of a broaching tool and thus not only form these finished surfaces quickly and easily, but with very great accuracy. In addition, if desired, the same broaching tool may simultaneously finish the flat surfaces of recesses 34 which are engaged by the surfaces 37 of the bearing blocks. In the same manner the shoulder 38 on the bearing blocks may be formed by a broaching operation. In addition, the two radial grooves or keyways 32 in the ears 12 may be formed simultaneously by a conventional keyway broach and the key 33 and surfaces 37 on the bearing block may likewise be formed by a single pass of a properly formed surface broaching tool.

The ears or lugs 36 on the bearing blocks are provided with suitable openings 40 for the reception of bolts, or cap screws, for securing the same to the ears 12 in any desired manner, as shown in Figs. 1 and 2. These same fastening means are used to secure an emergency brake drum to the propeller shaft. In a number of automobiles an emergency brake drum is provided upon that portion of the propeller shaft that projects from the transmission casing. Since the forward universal joint of the propeller shaft is also mounted at the same point a rather serious assembly problem is presented, a highly satisfactory solution of which is provided in accordance with the present invention. As shown in the drawings, the brake drum 42, which may be of any desired construction, is provided with a central transversely extending web 43, having a central opening 44 adapted to fit upon a cylindrical portion of the collar 11 just forwardly of the ears 12 with the web 43 abutting against the ears 12 in the manner best shown in Fig. 2. A pair of bolts 45 project through suitable openings in the web 43 of the brake drum, each of the ears 12 and through the openings 40 in each of the bearing blocks 14, and these parts are secured in position by means of suitable nuts 46 on the bolts 45. Preferably, the shanks of the bolts 45 have a relatively close fit upon the bolt openings in the web 43 and the ears 12, but the bolt extends loosely through the openings 40 of the bearing blocks inasmuch as the bearing blocks are located by means of the key and shoulder previously described.

The yoke member 28 of the universal joint has a shank 50 which forms the male member of a spline joint. The male spline member is provided with a plurality of spline teeth 51 adjacent its outer end and a reduced neck portion 52 inwardly of the splined teeth. A female spline member 53, provided with spline teeth 54, is secured to the rearward portion of the propeller shaft (not shown) in any desired manner. A suitable packing ring 55 is secured to the end of the female spline member by means of an annular retaining ring 56 for sealing lubricant within and preventing the access of dirt and foreign matter to within the spline joint. Preferably, the spline members are formed of relatively large diameter and provided with a large number of spline teeth in order that the load on the spline teeth may be reduced to a minimum. As a consequence of the small load on the spline teeth the usual practice of hardening the spline after it is machined may be omitted, thus avoiding the difficulties commonly incident to heat treatment such as warpage and distortion, and making it possible to secure a closer fit between the mating spline teeth. One advantage of eliminating the heat treatment and consequent warpage of the spline teeth is that in addition to the sliding fit between the outside diameter of the male teeth and the inside diameter of the female teeth at 57 a sliding fit may be provided between the reduced cylindrical neck 52 and the inside diameter of the female teeth at 58, thus in effect producing a sliding bearing engagement between the male and female spline members which is longer than the teeth on the male spline. Any desired form of spline tooth may be utilized, but it is preferred to utilize involute spline teeth to facilitate securing an accurate fit. The involute teeth on the male spline may be either generated in the usual manner, or broached, while the involute teeth on the female spline may be formed by the usual broaching operation.

In Figs. 4, 5, and 6 is shown a modified form of the invention. As there shown, the torque transmitting collar 60 is provided with a pair of ears 62 to which the bearing blocks 64 are secured. As distinguished from the previous modification, the torque load transmitted between the collar 60 and the bearing blocks 64 is transmitted by means of a key 66 formed in each of the ears 62 and a keyway 67 formed in the bearing block. The radial thrust load in this form of the invention is sustained by a shoulder 68 on the bearing block extending at right angles to the keyway 67 and adapted to engage a surface 69 on the collar 60. The sides of the key 66, the slot 67, the shoulder 68, and surface 69 are all planular and hence may be formed easily and accurately by broaching operations, as in the previous modification.

In this form of the invention, the brake drum is omitted and the bearing blocks 64 are secured to the ears by means of cap screws 70 which project through suitable openings 71 in the lugs or ears 72 on the bearing blocks and are threaded into tapped openings in the ears 62. The openings 71 are preferably somewhat larger than the shanks of the cap screw 70 in view of the fact that bearing blocks are located by means of key 66 and shoulder 68. The heads of the cap screws 70 are preferably positioned on the bearing block side of the ears 12 to facilitate access during assembly operation. A suitable lock washer 73 is provided to prevent loosening of screws 70. It will be understood, however, that if desired this form of the invention may be combined with a brake drum in the manner disclosed in connection with the prior form.

In all other respects the embodiment of the invention shown in Figs. 4 to 6 is similar to that described in Figs. 1 to 3.

Figure 7:
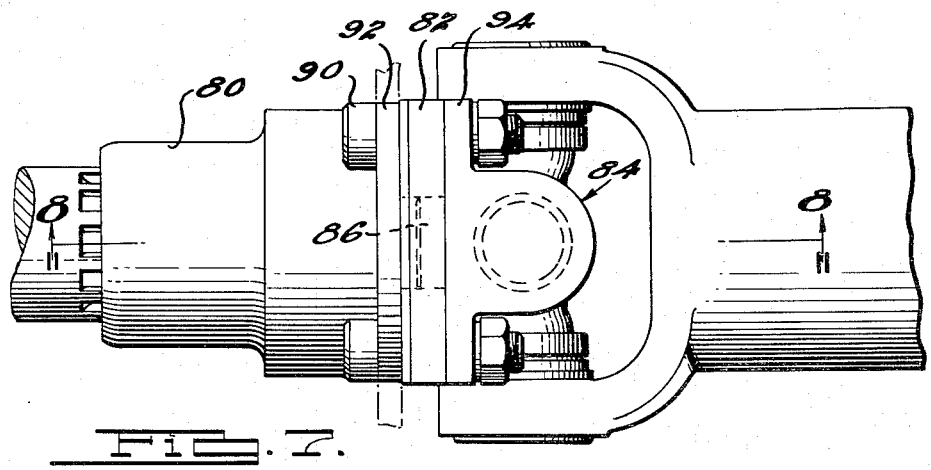
Fig. 7 is a view similar to Figs. 1 and 4 showing a further modified form of the invention.
Figure 8:
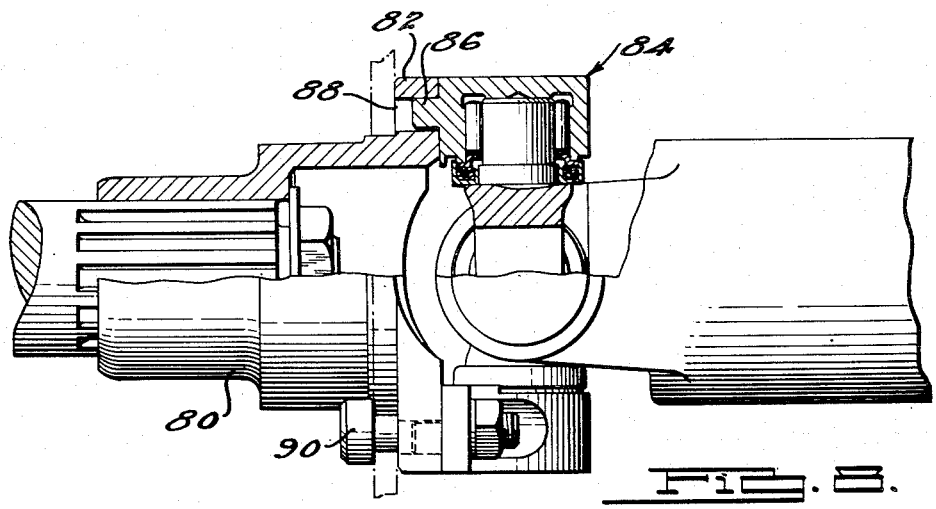
Fig. 8 is a view partially in section on the line 8—8 of Fig. 7.
Figure 9:
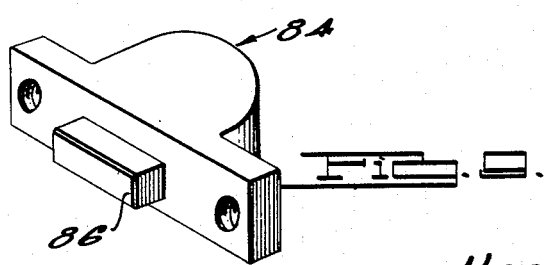
Fig. 9 is a perspective view of the bearing block embodied in the universal joint shown in Figs. 1 and 4.

Referring to Figs. 7, 8, and 9, there is shown a further modified form of the invention in which the torque transmitting collar 80 is provided with a pair of ears 82 to which the bearing blocks 84 are secured. The torque driving load between the bearing blocks and ears 82 is transmitted by means of a rectangular key 86 on each bearing block, shown best in Fig. 9, which projects into a correspondingly shaped opening 88 in each ear. The rectangular keys 86 are formed to closely fit the ends of the outer side of the rectangular slots or openings 88 in the ears in order that the blocks will be positively and accurately located with respect to the collar 80.

When this form of universal joint is assembled in connection with emergency brake drums, as shown in Figs. 1 to 3, inclusive, suitable bolts 90 are provided which project through aligned openings in the flange 92 of the brake drum, the ears 82, and lugs 94 on the bearing blocks 84. Where the joint is not assembled in connection with brake drums, as at the rear end of the propeller shaft, machine screws, arranged in the manner shown in Figs. 4 and 5, may be utilized to secure the bearing blocks to the ears.

It is apparent that in the form of construction shown in Figs. 7 to 9, the rectangular key 86 may be formed readily by surface broaching operations since its surfaces are all planular and, likewise, the slots or openings 88 may be formed by an internal broach. Since the two openings 88 in the respective ears 82 on the collar 80 extend parallel to each other, these two openings may be broached simultaneously by a pair of parallel broaches secured to a single fixture.

In all other respects, the structure shown in Figs. 7 to 9, inclusive, is similar to that shown in the previous figures of the drawings.

It is apparent that there is provided in accordance with the present invention, a knockdown universal joint of the type embodying the use of removable bearing joints for the cross trunnions in which the locating means for the bearing blocks may be very accurately and cheaply formed, and that there is also provided, in accordance with the present invention, a novel and efficient assembly of such universal joint in combination with the usual propeller shaft emergency brake drum.

While several modifications of the invention are shown and described herein, it is apparent that others are available within the scope of the appended claim.

What I claim is:

A universal joint and brake drum assembly comprizing a torque transmitting collar having a pair of oppositely directed radially extending ears; a brake drum having a web portion surrounding said collar and seated against said ears; an individual bearing block mounted on the opposite side of each of said ears from said brake drum web; interengaging surfaces on said ears and blocks for locating said blocks radially and circumferentially on said ears, respectively, with the axes of said blocks in alignment; projecting means on the blocks for fastening them to the ears; aligned bolt openings in said ears, the web of the brake drum and said projecting means; bolts extending through said openings for bolting the blocks and the brake drum in assembled relation with respect to said ears, said bolts having a relatively close fit in the openings in the ears and brake drum in order to transmit the brake torque and having a relatively loose fit in the openings in said projecting means in order to avoid interference with said interengaging surfaces for locating said blocks; and a universal joint cross member having one pair of trunnions journalled in said bearing blocks.

HANS WOLLNER.